US009451623B2

United States Patent
Razavi et al.

(10) Patent No.: US 9,451,623 B2
(45) Date of Patent: Sep. 20, 2016

(54) SMALL CELL BASE STATION COMPRISING MULTIPLE ANTENNAS, AND A METHOD OF CONTROLLING RECEPTION PATTERN BY SELECTING A SUBSET OF THE ANTENNAS FOR USE

(75) Inventors: Rouzbeh Razavi, Dublin (IE); Holger Claussen, Straffan (IE)

(73) Assignee: Alcatel Lucent, Boulogne-Billancourt (FR)

(*) Notice: Subject to any disclaimer, the term of this patent is extended or adjusted under 35 U.S.C. 154(b) by 250 days.

(21) Appl. No.: 14/007,500

(22) PCT Filed: Mar. 2, 2012

(86) PCT No.: PCT/EP2012/000923
§ 371 (c)(1),
(2), (4) Date: Dec. 6, 2013

(87) PCT Pub. No.: WO2012/130371
PCT Pub. Date: Oct. 4, 2012

(65) Prior Publication Data
US 2014/0141791 A1    May 22, 2014

(30) Foreign Application Priority Data
Mar. 29, 2011   (EP) ..................................... 11290154

(51) Int. Cl.
| | |
|---|---|
| *H04W 72/06* | (2009.01) |
| *H04W 16/28* | (2009.01) |
| *H04W 24/02* | (2009.01) |
| *H04W 52/02* | (2009.01) |
| *H04W 72/04* | (2009.01) |

(Continued)

(52) U.S. Cl.
CPC ............. *H04W 72/06* (2013.01); *H04W 16/28* (2013.01); *H04W 24/02* (2013.01); *H04W 52/0206* (2013.01); *H04W 72/0446* (2013.01); *H04W 16/16* (2013.01); *H04W 84/045* (2013.01)

(58) Field of Classification Search
CPC .................... H04W 72/0446; H04W 52/0206; H04W 24/02; H04W 72/06; H04W 16/28; H04W 16/16; H04W 84/045
See application file for complete search history.

(56) References Cited

U.S. PATENT DOCUMENTS

| | | | |
|---|---|---|---|
| 2003/0050086 A1* | 3/2003 | Lee et al. ....................... | 455/522 |
| 2003/0153322 A1* | 8/2003 | Burke et al. ................... | 455/450 |

(Continued)

FOREIGN PATENT DOCUMENTS

| | | |
|---|---|---|
| CN | 1452417 | 10/2003 |
| CN | 1455535 | 11/2003 |

(Continued)

OTHER PUBLICATIONS

International Search Report for PCT/EP2012/000923 dated Jul. 5, 2012.

(Continued)

*Primary Examiner* — Dinh P Nguyen
(74) *Attorney, Agent, or Firm* — Fay Sharpe, LLP

(57) ABSTRACT

A method is provided in a small cell base station comprising multiple antennas of controlling reception pattern by selecting a subset of the antennas for use. The method comprises determining a ranking value for each of subsets of the antennas dependent upon measurements of received signal quality, and choosing the subset of the antennas for use that provides the highest ranking value.

6 Claims, 3 Drawing Sheets

(51) Int. Cl.
*H04W 16/16* (2009.01)
*H04W 84/04* (2009.01)

(56) References Cited

U.S. PATENT DOCUMENTS

2004/0170219 A1  9/2004 Sasaki et al.
2006/0040707 A1* 2/2006 Kish et al. ................ 455/562.1
2009/0233646 A1* 9/2009 Cyzs et al. ................ 455/562.1
2009/0286545 A1* 11/2009 Yavuz et al. .............. 455/452.1
2011/0090799 A1* 4/2011 El-Hassan et al. ........... 370/241

FOREIGN PATENT DOCUMENTS

| EP | 2 161 851 A1 | 3/2010 |
| JP | 2004-222172 | 8/2004 |
| WO | WO 99/38275 A1 | 7/1999 |

OTHER PUBLICATIONS

Japan Office Action dated Dec. 2, 2014.

* cited by examiner

SMALL CELL BASE STATION COMPRISING MULTIPLE ANTENNAS, AND A METHOD OF CONTROLLING RECEPTION PATTERN BY SELECTING A SUBSET OF THE ANTENNAS FOR USE

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as small cells, microcells, picocells, or femtocells, but we use the terms small cells and femtocells interchangeably and generically for cells that are smaller than macrocells. One way to establish a femtocell is to provide a femtocell base station that operates within a relatively limited range within the coverage area of a macrocell. One example of use of a femtocell base station is to provide wireless communication coverage within a building.

The femtocell base station is of a relatively low transmit power and hence each femtocell is of a small coverage area compared to a macrocell. A typical coverage range is tens of metres.

Femtocell base stations have auto-configuring properties so as to support plug-and play deployment by users, for example in which femto base stations may integrate themselves into an existing macrocell network so as to connect to the core network of the macrocell network.

One known type of Femtocell base station uses a broadband Internet Protocol connection as "backhaul", namely for connecting to the core network. One type of broadband Internet Protocol connection is a Digital Subscriber Line (DSL). The DSL connects a DSL transmitter-receiver ("transceiver") of the femtocell base station to the core network. The DSL allows voice calls and other services provided via the femtocell base station to be supported. The femtocell base station also includes a radio frequency (RF) transceiver connected to an antenna for radio communications. An alternative to such a wired broadband backhaul is to have a wireless backhaul.

Femtocell base stations are sometimes referred to as femtos.

The small coverage range of small cells means that the radio spectrum can be used much more efficiently than is achievable using macrocells alone, and as the radio link between small cell base station and a user terminal is small, good quality links are possible giving high data rates. However, radio interactions between femtos and macrocells need to be managed. Specifically, radio interference is known to be an issue to be addressed in joint deployments of femtos within macrocellular networks.

As regards the use of radio spectrum, small cells and macrocells can be deployed in basically two ways. One is to use dedicated channels so that small cells use different frequency bands to the macrocells, and hence there is no interference; and the other is co-channel use where the same frequency bands are used by both small cells and macrocells. Despite the interference caused, co-channel operation is desirable as it provides greater use of bandwidth, but interference needs to be minimised. In addition to interference between femtos and macrocells, the likely future dense deployment of femtos will require management of interference between femtos (so-called "intra femtocell interference") even when the macrocells and femtos use different frequency bands.

Interference may be considered from the perspective of macrocell base stations or femtocell base stations, and in the downlink direction from a base station or in the uplink direction to a base station. However, for femtos connected to user terminals, transmit power is very low in both uplink and downlink directions, particularly as interference to macrocells by femto users is required to be low. In consequence, interference caused to a femto by a macrocell base station is normally more significant than the other way round.

Known femtos use static antenna systems with adjustable output power, where the antennas are simple dipoles or printed-circuit-board (PCB) antennas. Such antennas have low gain and basically provide omni-directional fixed coverage patterns.

SUMMARY

The reader is referred to the appended independent claims. Some preferred features are laid out in the dependent claims.

An example of the present invention is a method in a small cell base station comprising switchable antennas of controlling reception pattern by selecting a subset of the antennas for use. The method comprises determining a ranking value for each of subsets of the antennas dependent upon measurements of received signal quality, and choosing the subset of the antennas for use that provides the highest ranking value.

Some preferred embodiments involve dynamically choosing the antenna subset, in other words, antenna or antenna combination, that is optimum or near optimum, in a manner that is simple, fast and responsive to changes in the radio environment. Some preferred embodiments provide a good way to select antennas so as to mitigate radio interference. Some preferred embodiments involve a systematic evaluation of available antenna subsets to choose, for use, the one with a highest ranking. Some preferred embodiments involve periodically evaluating various antenna subsets so as to be adaptive to changes in the radio environment.

Some preferred embodiments involve intelligently selecting antenna subsets for testing and possible use, reducing performance losses due to incorrect antenna selection, and adaptive learning from previous evaluations of antenna subsets.

In some preferred embodiments, excessive testing of unsuitable antenna subsets is avoided.

Some preferred embodiments function in real-time, so heavy computation is not involved. Also, some preferred embodiments are responsive to changes in the radio environment, such as due to user terminal mobility and the initiation of new voice calls or data sessions.

Compared to the known approach of using an onmi-directional antenna, uplink interference to signals from the small cell-connected user terminals may be reduced. Lower transmit powers from small cell base stations may result, giving longer battery life and 'greener' communications. As a possible additional benefit, downlink interference from the small cell base station to users of other base stations may also be reduced in consequence.

BRIEF DESCRIPTION OF THE DRAWINGS

Embodiments of the present invention will now be described by way of example and with reference to the drawings, in which.

DETAILED DESCRIPTION

The inventors realised that implementing classic beam forming, namely the use of multiple antenna elements with particular amplitudes and phase shifts is not feasible in femtos.

The inventors realised that use of a multi-element switchable antenna is useful for interference mitigation. This is where a number of antennas are provided and a switch is used to select which antenna or combination of antennas to use. The inventors realised that the computational complexity of this approach is generally low, but as it depends on the number of antennas being used, use of more than two antennas at a time is usually avoided.

The inventors realised that to make effective use of this approach, interference must be managed by addressing how to dynamically select an antenna pattern giving a good signal, from the user terminal of interest, with little interference.

We now describe example embodiments of the invention starting with a description of the network before describing a femtocell base station and its functionality. The functionality is based on cycles each involving intelligent selection of an antenna subset to test, testing of the antenna subset, and intelligent choice of an antenna subset for use in communications.

Network

Figure 1:
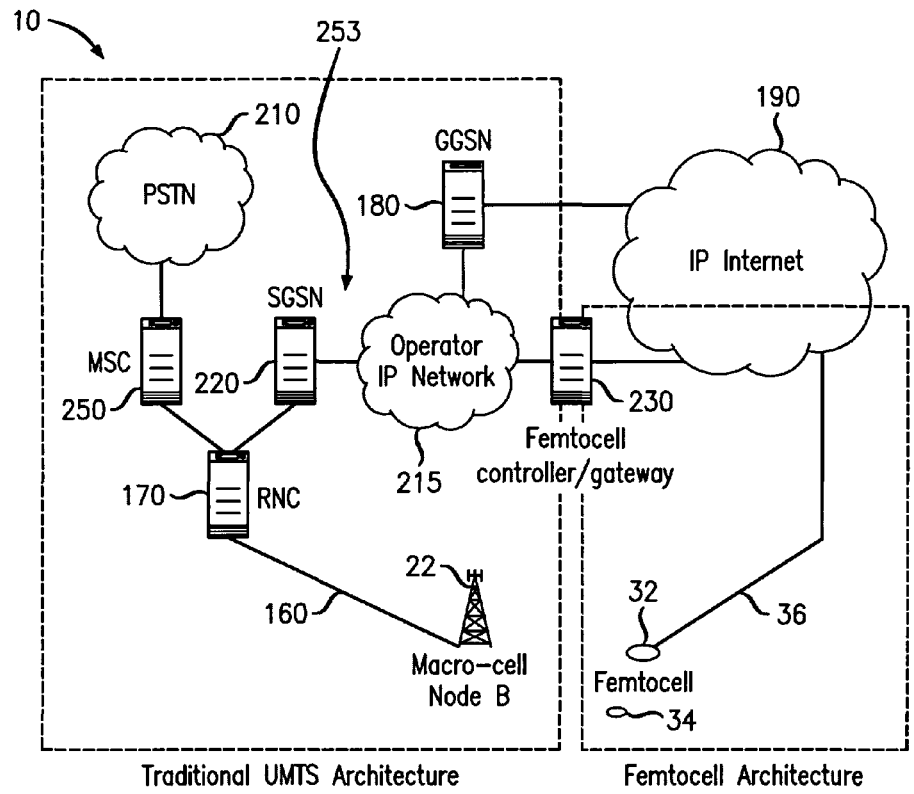
FIG. 1 is a diagram illustrating a wireless communications network according to a first embodiment of the present invention.
Figure 2:
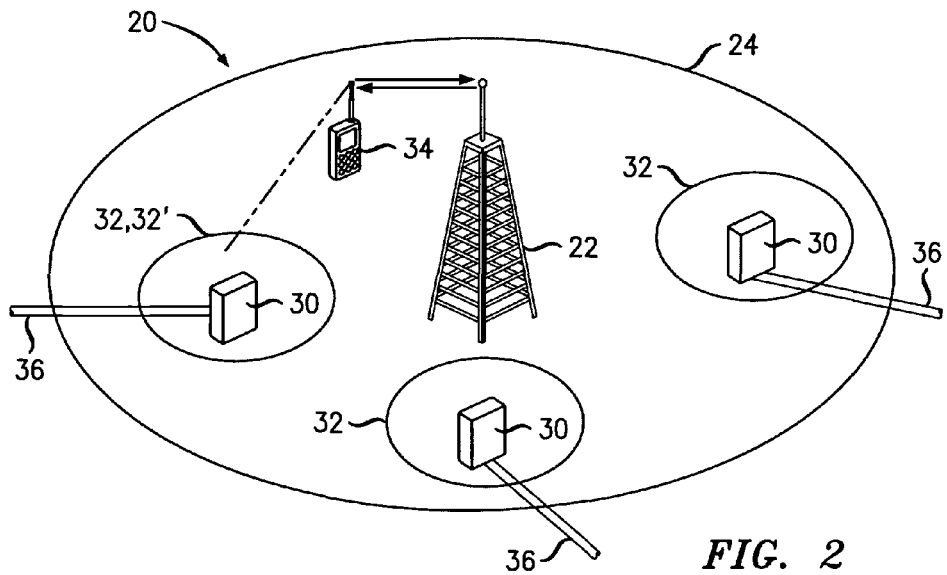
FIG. 2 is a diagram illustrating an example femtocell base station deployment within one macrocell shown in FIG. 1.

As shown in FIGS. 1 and 2, a network 10 for wireless communications, through which a user terminal 34 may roam, includes two types of base station, namely macrocell base stations and femtocell base stations (the latter being sometimes called "femtos"). One macrocell base station 22 is shown in FIGS. 1 and 2 for simplicity. Each macrocell base station has a radio coverage area 24 that is often referred to as a macrocell. The geographic extent of the macrocell 24 depends on the capabilities of the macrocell base station 22 and the surrounding geography.

Within the macrocell 24, each femtocell base station 30 provides wireless communications within a corresponding femtocell 32. A femtocell is a radio coverage area. The radio coverage area of the femtocell 32 is much less than that of the macrocell 24. For example, the femtocell 32 corresponds in size to a user's office or home.

As shown in FIG. 1, the network 10 is managed by a radio network controller, RNC, 170. The radio network controller, RNC, 170 controls the operation, for example by communicating with macrocell base stations 22 via a backhaul communications link 160. The radio network controller 170 maintains a neighbour list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. For circuit-switched traffic, a mobile switching centre 250 is provided with which the radio network controller 170 may communicate. The mobile switching centre 250 communicates with a circuit-switched network such as a public switched telephone network (PSTN) 210. For packet-switched traffic, the network controller 170 communicates with serving general packet radio service support nodes (SGSNs) 220 and a gateway general packet radio support node (GGSN) 180. The GGSN then communicates with a packet-switch core 190 such as, for example, the Internet.

The MSC 250, SGSN 220, GGSN 180 and operator IP network constitute a so-called core network 253. The SGSN 220 and GGSN 180 are connected by an operator IP network 215 to a femtocell controller/gateway 230.

The femtocell controller/gateway 230 is connected via the Internet 190 to the femtocell base stations 30. These connections to the femtocell controller/gateway 230 are broadband Internet Protocol connections ("backhaul") connections.

In FIG. 2, three femtocell base stations 30 and corresponding femtocells 32 are shown for simplicity.

It is possible for a mobile terminal 34 within the macrocell 24 to communicate with the macrocell base station 22. When the mobile terminal 34 enters into a femtocell 32 for which the mobile terminal is registered for communications within the femtocell base station 30, it is desirable to handover the connection with the mobile terminal from the macrocell to the femtocell. In the example shown in FIG. 2, the user of mobile terminal 34 is a preferred user of the nearest 32' of the femtocells 32.

As shown in FIG. 2, the femtocell base stations 30 are connected via the broadband Internet Protocol connections ("backhaul") 36 to the core network (not shown in FIG. 2) and hence the rest of the telecommunications "world" (not shown in FIG. 2). The "backhaul" connections 36 allow communications between the femtocell base stations 30 through the core network (not shown). The macrocell base station is also connected to the core network (not shown in FIG. 2).

Femtocell Base Station

Figure 3:
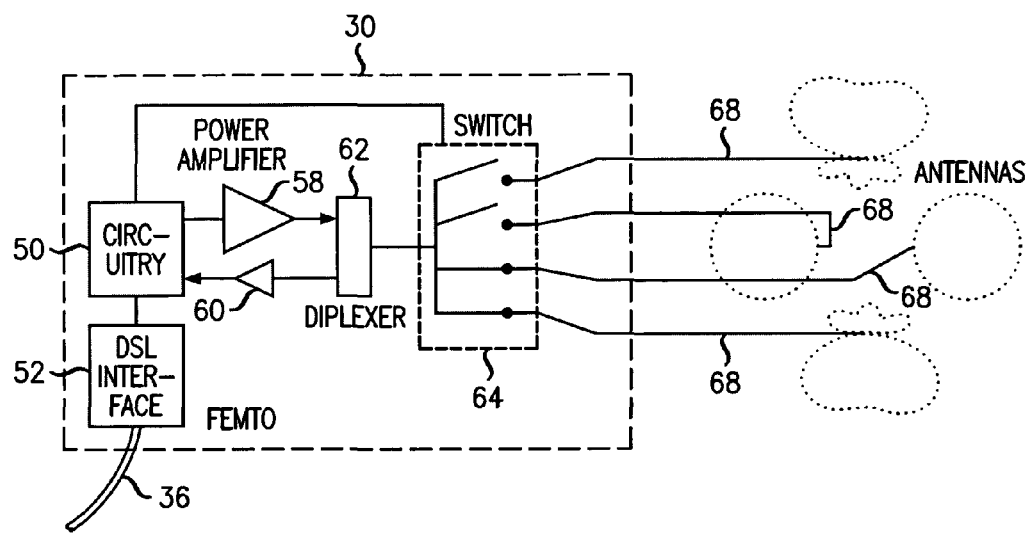
FIG. 3 is a diagram illustrating a femto with a multi-element switchable antenna.

As shown in FIG. 3, the femto includes processing circuitry 50 connected to a backhaul interface 52 connected to a backhaul DSL line 36. The processing circuitry is connected to transmit amplifier 58 and receive amplifier 60 that are both connected to a diplexer 62. The diplexer 62 is connected to a switch 64. The switch 64 is a one-to-four switch having four outputs 66 each connected to a respective antenna (sometimes referred to as an antenna element) 68. For computational simplicity and to keep impedance mismatches within acceptable limits, not more than two antenna elements are connected at any one time. Accordingly for the four antenna system there is a total of ten antenna patterns possible (in other words, ten antenna subsets, in other words a choice of ten different antennas or antenna combinations, are possible). Namely, these are the four antennas individually, plus six possible combinations of two antennas (namely first and second, first and third, first and fourth, second and third, second and fourth, and third and fourth).

In this example the antenna elements are each patch antennas being small and ease to connect within the housing of the femto which is approximately 17 by 15 by 3.5 centimetres in size, and contains a single main circuit board(not specifically shown). Patch antennas are flat in shape and easily located in the base station placed parallel to the main circuit board.

Figure 4:
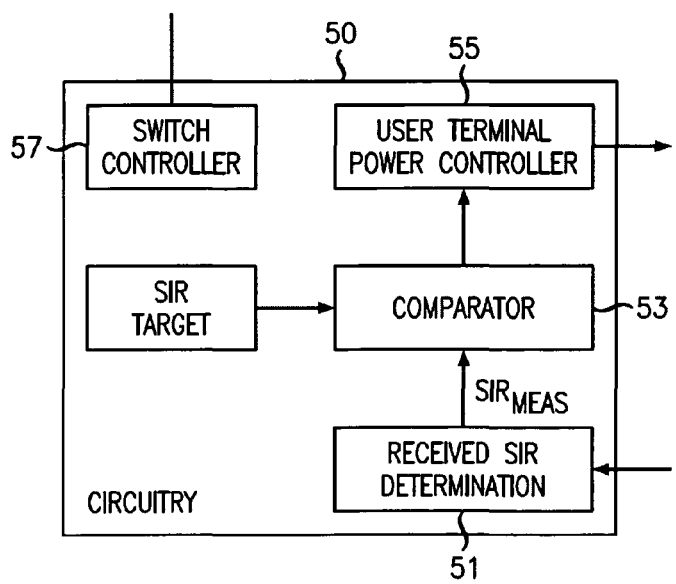
FIG. 4 is a diagram illustrating in greater detail some circuitry in the femto shown in FIG. 3.

As shown in FIG. 4, the circuitry 50 of the femto 30, includes a processor 51 operative to determine received Signal-to-Interference Ratio, SIR, a comparator 53 operative to compare the determined values to a target SIR value, and a user terminal transmit power controller 55. The circuitry 50 also includes a switch controller 57 connected to the switch 64.

Femtocell Base Station Function

At any given time the femto should be operating with a radio reception pattern which provides high gain towards the a femto-connected user terminal and low gain towards other user terminals, such as macrocell-connected users and users connected to other femtos. The fitness of each pattern is judged by assessing the transmission power required from the user terminal connected to the femto that satisfies an uplink Signal to Interference ratio, SIR, requirement of the femto. As the femto uses WCDMA technology, and the transmission power of the user terminal is controlled by the femto in a fast power uplink control mechanism, the femto monitors the relative power of its users even if the actual initial power is unknown. Accordingly the femto, particularly its processor 51, performs frequent repeat measurement of received Signal-to-Interference ratio, and each time, the comparator 53 compares the result to the target SIR requirement. Upon finding that the measured SIR exceeds the Target SIR, the femto, specifically the user terminal power controller 55, commands the user terminal to lower its transmit power. On the other hand, upon measured SIR going below the Target SIR, the femto commands the user terminal to increase its transmit power. Accordingly, in this way, the transmit power of the user terminal relative to the initial transmit power of the user terminal is known to the femto.

Testing of Antenna Subsets

The switch controller 57 controls the switch 64 so that the femto tries possible antenna subsets (effectively possible antenna patterns), and selects for use the most appropriate one, namely the one requiring low transmit power to satisfy the SIR target, else if the maximum uplink transmit power is reached but the SIR target is not reached, the antenna subset giving the best SIR is selected for use.

The inventors realised that, on the one hand, frequent testing of antenna subsets would result in fast adaptation in a dynamically changing radio environment but because some of the antenna subsets might perform poorly, frequent drops in SIR might occur. The inventors also realised that very frequent SIR measurements may not be acceptable in view of limits for acceptable packet loss and packet delay, assuming retransmission is allowed. The inventors realised that how to test antenna subsets was a trade-off, aimed at providing reasonable fast adaptation but an acceptable packet loss rate and packet delay.

Testing One Antenna Subset in each Interval between use Periods

The inventors realised that testing all antenna subsets in a testing interval before each use period would be excessive. The inventors also realised that totally avoiding testing antenna subsets that had performed poorly in the past would be disadvantageous in a changing radio environment where an antenna subset might perform better after a time. Accordingly the inventors came to the following approach.

Figure 5:
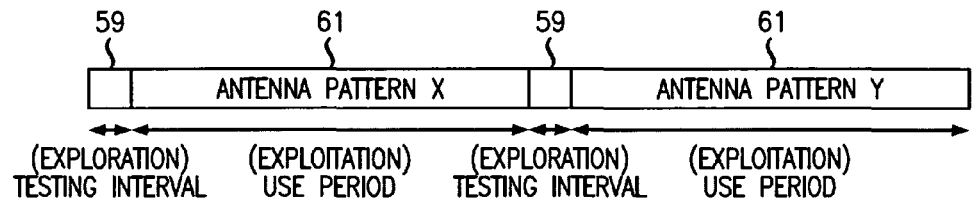
FIG. 5 is a diagram illustrating an example of the iterative femto operating cycle involving using a selected antenna subset (first use period), testing an antenna subset (testing interval) to choose an antenna subset for subsequent use, then using chosen antenna subset (second use period)

As shown in FIG. 5, a single antenna subset is tested in each testing interval 59 between use periods 61. It can be considered that there are cycles of operation, each cycle having an antenna subset testing phase 59 followed by a use period 61 using the best found antenna subset so far, according to a ranking scheme explained in more detail below.

The interval required to test a single antenna subset is one UMTS time slot (equivalent to 0.66 milliseconds) because this is the rate at which an SIR evaluation is possible being the time between measurement reports provided for power control in line with the UMTS standard.

This approach can be considered as a distributed testing scheme in which errors due to power fluctuations, and consequential SIR drops, in the uplink direction are likely small during testing, because the testing intervals are short.

Additionally, to combat potential SIR drops down to unacceptable levels during testing, user terminals connected to the femto are commanded to temporarily increase their transmit power just before the testing occurs. This is described in more detail later below.

As explained in more detail below, from the testing, the various antenna subsets are ranked. After a smoothing operation as explained below with reference to FIG. 6, the antenna subset with the best ranking is selected and used. The rankings are, of course, updated over time.

Ranking the Antenna Subsets

The ranking is dependent upon the radio environment, the user terminal's location, and the radio channel properties. The ranking may be considered an estimate of how well a particular antenna subset can capture the user terminal of interest and simultaneously avoid interfering users. This means high antenna gain toward the user terminal of interest and low antenna gain towards interfering users. Since only the the relative values of the rankings are important, the (raw) ranking R of antenna subset x is the difference between the observed SIR (in dB) for that antenna subset and the uplink transmit power of the user terminal (in dBm). This is shown mathematically as $$R(x)=\text{SINR}_x - P_{uplink}.$$

As mentioned previously, since the uplink transmission powers of user terminals connected to the femto are controlled by the femto, the femto tracks the transmit power of each of the user terminals. (The transmit power as tracked are relative transmit powers, being relative to a respective initial transmit power.)

Except for the time slots at which testing occurs (the testing interval), at each time slot the femto compares the ranking of the possible antenna subsets and selects the one with the highest ranking for use.

Updating the Ranking of Antenna Subsets

As mentioned previously, SIR values are calculated at each time slot for power control of the user terminals. Hence a new estimate of ranking value is determined every time slot for the current (in use or being tested) antenna subset.

The changes of ranking values are smoothed so that the updated (smoothed) ranking value R(x) is the old value $(R(x)_{old})$+ a weighted difference between the old value and the estimated new (raw) value $(R(x)_{new})$. This can be considered a temporal difference averaging method according to $$R(x) <= R(x)_{old} + \alpha \cdot [R(x)_{new} - R(x)_{old}]$$

where $\alpha$ is the learning rate between 0 and 1. A higher learning rate suppresses contributions due to older measurements faster than a lower learning rate and the learning rate is adaptively changed dependent on the time since that antenna subset was last tested.

Figure 6:
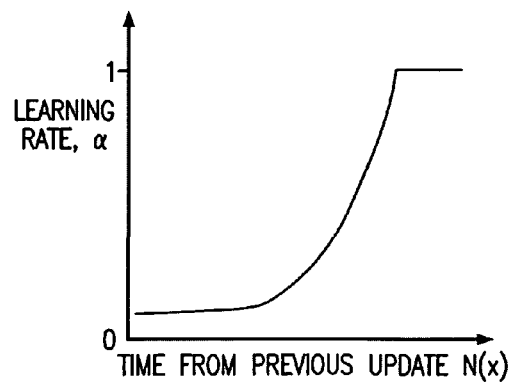
FIG. 6 is a diagram illustrating learning rate factor adaptation for an antenna subset as a function of time since previous testing of that antenna subset.

As shown in FIG. 6, specifically an ascending second order convex function is used, namely $$\alpha = (N(x)/k)^2 + c$$

where $N(x)$ is the time in timeslots since last testing or using of antenna subset x, and K and c are constants. Specifically, c is the minimum learning rate and K is a scaling factor that defines the slope of the curve.

The effect is that if measurements are close together in time, averaging is useful and a low learning rate is expected. On the other hand, if the time between measurements is long, then the chance that older measurements are outdated increases, so a quicker adaptation to later measurements becomes desirable and hence a higher learning rate is used.

The inventors realised that this smoothing was appropriate because, on the one hand, an alternative of completely replacing the old value with the new would be undesirable because the ranking would be very susceptible to errors if based on merely a measurement in a single time slot subject high frequency noise, but, on the other hand, as the radio environment changes over time, fairly rapid adaptation of ranking is desirable.

As a practical matter, if a previous measurement is older than 5 seconds (7500 UMTS time slots) the previous ranking is fully over-written completely (in other words, $\alpha=1$).

Choosing which Antenna Subset to Test

The choice of use period duration, in other words the temporal separation between testing intervals, is a trade-off between the rate of adaptation of the femto to its radio environment and the risk of SIR drops due to testing of a poor performing antenna subset. In this example, a use period of between approximately 50 and 150 UMTS time slots, in other words 0.03 to 0.1 milliseconds is appropriate. For example one testing interval (1 UMTS time slot) occurs after a use period of approximately 100 UMTS timeslots.

In each testing interval, an antenna subset other than the one currently in use is tested. In deciding which antenna subset to test, in addition to ranking values, the time since that antenna subset was last measured, in other words, last tested or used, is also considered. The reason for this is that the performance of an antenna subset is very much dependent on time-varying factors such as the user terminal location, the local environment and radio channels used, so a poorly-performing antenna subset may get better after a time.

In this example a simple and linear combination of the two metrics is used, (although in other embodiments, the two metrics are combined in different ways.) Specifically, the choice of which antenna subset to test is the one which gives the highest sum of its Ranking and time since last tested appropriately scaled. This is $$\text{Explore}(x) = R(x) + \epsilon \cdot N(x)$$

where Explore(x) is the measure of suitability of the antenna subset 'x' for test and N(x) is the number of time slots from the previous test, or use, of the antenna subset 'x' and $\epsilon$ is a scaling factor.

The value of Explore is determined for all antenna subsets except the one that is currently in use and the antenna subset giving the highest Explore value is selected for testing.

Power Increase before Testing

There is always a degree of risk due to SIR drops during testing, even though the intelligent choice of antenna subset to test reduces this risk. Accordingly, to minimise the impact of SIR drops, for the testing interval the transmit power is increased of user terminals connected to the femto. This is effected by sending a power control command from the femto to the user terminals.

A maximum transmit power increase ($P_{max\_Explor}$) is set so as to avoid excessive interference to other user terminals, however the maximum increase is often unnecessary. The increase in transmit power to command is calculated based on antenna ranking, or based on statistical similarity, or based on both antenna ranking and statistical similarity. These three options are now described in turn.

Calculating Power Increase based on Antenna Ranking

In this first approach, accurate rankings are assumed for this purpose and the power increase to be applied is simply determined based on the difference between the two ranking values. Specifically the power increase is the less of the maximum allowed power increase before the test interval ($P_{Max\_Explore}$) and the difference between the ranking value of the last used antenna subset (that use being in the last use period) and the ranking value of the antenna subset under test. This is on that assumption that the ranking of the last used one is higher than the ranking of the one under test, which is appropriate as the antenna subset with highest ranking is in use/selected for use.

The above may be written mathematically as:

$$P_{Explore\_ranking} = \min\left([R(\text{last\_used\_subset}) - R(\text{test\_subset})], P_{max\_Explor}\right)$$

where $$R(\text{last\_used\_subset}) - R(\text{test\_subset}) >= 0$$

Calculating Power Increase based on Statistical Similarity

In an otherwise similar embodiment, the statistical similarity of the gain patterns of the two antenna subsets (the one used in the last use period and the one under test) is used instead to determine the level of the power increase to apply. This does not rely on an assumption that ranking values are accurate.

The idea is that if the patterns are found to be very different then, to be on the safe side, a larger power increase is more appropriate.

In this approach, a similarity index is determined.

The similarity index is a value in range of [0, 1] and is defined as the ratio of the common area between the two antenna patterns divided by the maximum of the areas under the two patterns. In other words, if $g(m, \theta)$ represents the gain pattern of the mth antenna pattern. The index of similarity between pattern n and m is defined as $$I(n, m) = \frac{\int_0^{2\pi} \min(g(m, \theta), g(n, \theta)) \, d\theta}{\max\left(\int_0^{2\pi} g(m, \theta) \, d\theta, \int_0^{2\pi} g(n, \theta) \, d\theta\right)}$$

In this approach the power increase before testing is set based merely on the degree of similarity between the two patterns: the more the two antenna subsets are dissimilar in this regard, the more should power be increased before the test. This follows:

$$P_{Explore\_statistical} = [1-I(\text{last\_used\_subset, test\_subset})] * P_{max\_Explor}$$

where I is the similarity index.

The femto includes a look-up table in which the similarity index values are stored. Given n individual antenna subset possibilities the femto stores n* (n−1) similarity index values.

Calculating Power Increase based on both Antenna Ranking and Statistical Similarity In a further otherwise similar embodiment, both the antenna ranking and the statistical similarity of the gain patterns of the two antenna subsets are used to determine the level of the power increase to apply.

This approach may be considered a useful compromise between the two approaches described above, where one assumes fully accurate ranking estimations and the other is purely based on general statistical similarity between the patterns of the antenna subsets.

Accordingly, in this example the actual power increase is considered as a weighted combination of those two metrics $$P_{Explore} = W_{ranking} * P_{Explore\_ranking} + W_{statistical} * P_{Explore\_statistical}$$

where $$W_{ranking} = 1 - W_{statistical}$$

The weightings of each power increase component reflects the certainty level of the ranking estimations, which is heavily dependent on the time from the previous evaluation of the ranking of the antenna subset under test.

In its simplest form, $W_{ranking}$ is selected to be a linearly decreasing function of N(x), where x is the antenna subset to be tried out and with offset of 1 at start, for example:

$$W_{ranking}(x) = \max([-N(x)/T\_deccor]+1, 0)$$

where T_deccor is the decorrelation time of the system (expressed in the same units as N(x), namely either pure time or the number time slots, in such way that if the previous evaluations were older than T_deccor (N(x)> T_decorr), the system would merely uses statistical similarity of the patterns to determine the power increase to be applied.

It may be considered that, in this example, the level of power increase is determined dependent upon the difference between the last determined ranking value of the last used subset of antennas and the last determined ranking value of the subset being measured; and also dependent upon an index of the similarity between the respective radio reception patterns of the two subsets of antennas. In determining the level of power increase to apply, the difference and the index are relatively-weighted, the weighting being dependent upon time since the antenna subset under test was last tested.

In some example systems there are a limited number of antenna subsets (for example ten when a femto having four antennas uses a maximum of two antennas at any time), and the base station readily tracks ranking values and time since previous testing of an antenna subset. Furthermore, as regards instructing an increase of the power of user terminals for testing of an antenna subset, the femto includes a look up table which stores the similarity index values.

General

The present invention may be embodied in other specific forms without departing from its essential characteristics.

The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

In some alternative embodiments, Inverted-F-antennas (IFAs) are used in place of patch antennas. An IFA antenna is easily placed to the upper two corners of the circuit board or is implemented directly on the main circuit board as a printed antenna.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method in a femtocell base station comprising multiple antennas of controlling reception pattern by selecting a subset of the antennas for use the method comprising:
    determining, by the femtocell base station, a ranking value of each of subsets of the antennas dependent upon measurements of received signal quality; and
    choosing, by the femtocell base station, the subset of the antennas for use that provides the highest ranking value, in which the measurement of an antenna subset is used to update a previously determined ranking value for the subset of the antennas, weighting given to the measurement depending upon the time since last measurement of the subset of the antennas, to provide the ranking value, wherein, in each test interval between use periods, a single subset of the antennas is tested and its ranking is compared to that of the one of the subsets of antennas that was last used, so as to determine for use the subset of the antennas that provides the highest ranking.

2. A method in a femtocell base station comprising multiple antennas of controlling reception pattern by selecting a subset of the antennas for use, the method comprising:
    determining, by the femtocell base station, a ranking value of each of subsets of the antennas dependent upon measurements of received signal quality; and
    choosing, by the femtocell base station, the subset of the antennas for use that provides the highest ranking value, in which the measurement of an antenna subset is used to update a previously determined ranking value for the subset of the antennas, weighting given to the measurement depending upon the time since last measurement of the subset of the antennas, to provide the ranking value, in which more weight is given to the measurement where the last measurement is relatively old, wherein, in each test interval between use periods, a single subset of the antennas is tested and its ranking is compared to that of the one of the subsets of antennas that was last used, so as to determine for use the subset of the antennas that provides the highest ranking.

3. A method in a femtocell base station comprising multiple antennas of controlling reception pattern by selecting a subset of the antennas for use, the method comprising:

determining, by the femtocell base station, a ranking value of each of subsets of the antennas dependent upon measurements of received signal quality; and choosing, by the femtocell base station, the subset of the antennas for use that provides the highest ranking value, in which the measurement of an antenna subset is used to update a previously determined ranking value for the subset of the antennas, weighting given to the measurement depending upon the time since last measurement of the subset of the antennas, to provide the ranking value, and in which up to a predetermined time since last measurement, the weight is a second order function dependent upon the time since last measurement, the weight being between a positive minimum and a maximum of one, wherein, in each test interval between use periods, a single subset of the antennas is tested and its ranking is compared to that of the one of the subsets of antennas that was last used, so as to determine for use the subset of the antennas that provides the highest ranking.

4. A method in a femtocell base station comprising multiple antennas of controlling reception pattern by selecting a subset of the antennas for use, the method comprising:

determining a ranking value of each of subsets of the antennas dependent upon measurements of received signal quality; and choosing the subset of the antennas for use that provides the highest ranking value, wherein, in each test interval between use periods, a single subset of the antennas is tested and its ranking is compared to that of the one of the subsets of antennas that was last used, so as to determine for use the subset of the antennas that provides the highest ranking, in which the femtocell base station sends an instruction for user terminals connected to the small cell base station to temporarily increase their transmit power for the measurement, wherein level of power increase is determined dependent upon the difference between the last determined ranking value of the last used subset of antennas and the last determined ranking value of the subset being measured.

5. A method in a femtocell base station comprising multiple antennas of controlling reception pattern by selecting a subset of the antennas for use, the method comprising:

determining a ranking value of each of subsets of the antennas dependent upon measurements of received signal quality; and choosing the subset of the antennas for use that provides the highest ranking value, wherein, in each test interval between use periods, a single subset of the antennas is tested and its ranking is compared to that of the one of the subsets of antennas that was last used, so as to determine for use the subset of the antennas that provides the highest ranking, in which the femtocell base station sends an instruction for user terminals connected to the small cell base station to temporarily increase their transmit power for the measurement, wherein the level of power increase is determined dependent upon, or also dependent upon, an index of similarity between the respective radio reception patters of the two subsets of antennas.

6. A femtocell base station with multiple antennas, the femtocell base station comprising:

a controller configured to control reception pattern by selecting a subset of the antennas for use;

a processor configured to determine a ranking value for each of subsets of the antennas dependent upon measurements of received signal quality; and a selector configured to choose the subset of the antennas for use that provides the highest ranking value, wherein in each test interval between use periods, a single subset of the antennas is tested and its ranking is compared to that of the one of the subsets of antennas that was last uses, so as to determine for use the subset of the antennas that provides the highest ranking in which the femtocell base station sends an instruction for user terminals connected to the small cell base station to temporarily increase their transmit power for the measurement, wherein the level of power increase is determined dependent upon, or also dependent upon, an index of similarity between the respective radio reception patters of the two subsets of antennas.

* * * * *